(12) United States Patent
Takeuchi et al.

(10) Patent No.: US 12,522,731 B2
(45) Date of Patent: Jan. 13, 2026

(54) CURABLE SILICONE COMPOSITION, ENCAPSULANT AND OPTICAL SEMICONDUCTOR DEVICE

(71) Applicants: DuPont Toray Specialty Materials Kabushiki Kaisha, Tokyo (JP); Rohm and Haas Electronic Materials Korea Ltd., Cheonan-si (KR)

(72) Inventors: Shunya Takeuchi, Ichihara (JP); Hyunji Kang, Hwaseong-Si (KR); Mayumi Matsuzaki, Ichihara (JP); Kasumi Takeuchi, Ichihara (JP)

(73) Assignees: DuPont Toray Specialty Materials Kabushiki Kaisha, Tokyo (JP); Rohm and Haas Electronic Materials Korea Ltd., Cheonan-si (KR)

(*) Notice: Subject to any disclaimer, the term of this patent is extended or adjusted under 35 U.S.C. 154(b) by 684 days.

(21) Appl. No.: 17/822,464

(22) Filed: Aug. 26, 2022

(65) Prior Publication Data

US 2023/0071052 A1 Mar. 9, 2023

(30) Foreign Application Priority Data

Aug. 31, 2021 (JP) ................. 2021-141244

(51) Int. Cl.
*C08L 83/04* (2006.01)
*C09K 3/10* (2006.01)
*C08G 77/12* (2006.01)
*C08G 77/20* (2006.01)
*C08K 3/22* (2006.01)

(52) U.S. Cl.
CPC ............ *C08L 83/04* (2013.01); *C09K 3/1018* (2013.01); *C08G 77/12* (2013.01); *C08G 77/20* (2013.01); *C08K 2003/2241* (2013.01); *C08K 2201/006* (2013.01)

(58) Field of Classification Search
CPC ..................................................... H01L 23/296
See application file for complete search history.

(56) References Cited

U.S. PATENT DOCUMENTS

| | | | |
|---|---|---|---|
| 12,037,481 B2 * | 7/2024 | Fukui | .......... C08K 9/06 |
| 2014/0339473 A1 | 11/2014 | Onai | |
| 2015/0141607 A1 | 5/2015 | Ko et al. | |
| 2016/0215141 A1 | 7/2016 | Chon et al. | |
| 2017/0146671 A1 * | 5/2017 | Shigeta | .......... G01T 1/20183 |
| 2022/0017746 A1 | 1/2022 | Horie et al. | |
| 2022/0204771 A1 | 6/2022 | Hore et al. | |

FOREIGN PATENT DOCUMENTS

| | | | | |
|---|---|---|---|---|
| CN | 114133743 A | * | 3/2022 | ........ C08L 83/04 |
| JP | H072520 A | | 1/1995 | |
| JP | 2007269612 A | | 10/2007 | |
| JP | 2010001335 A | | 1/2010 | |
| JP | 2010001336 A | | 1/2010 | |
| JP | 2010084118 A | | 4/2010 | |
| JP | 2011144360 A | | 7/2011 | |
| JP | 2012041496 A | | 3/2012 | |
| JP | 2012507582 A | | 3/2012 | |
| JP | 2014520946 A | | 8/2014 | |
| JP | 2014159586 A | | 9/2014 | |
| JP | 2015507025 A | | 3/2015 | |
| JP | 2015078375 A | | 4/2015 | |
| JP | 2015149379 A | | 8/2015 | |
| JP | 2016037562 A | | 3/2016 | |
| JP | 2020070223 A | | 5/2020 | |
| TW | 1657599 B | * | 4/2019 | |
| WO | 2020116441 A1 | | 6/2020 | |
| WO | 2020195914 A1 | | 10/2020 | |

OTHER PUBLICATIONS

Product data sheet for Shin Etsu KET-1650 A/B (no date).*
Machine translation of CN114133743 A (no date).*

* cited by examiner

*Primary Examiner* — Marc S Zimmer
(74) *Attorney, Agent, or Firm* — Ingrassia Fisher & Lorenz, LLP | IF&L

(57) ABSTRACT

To offer curable silicone compositions with outstandingly high thixotropy, which can form hardened material with an outstanding refractive index transparency.

The problem above is solved by curable silicone compositions which include (A) alkenyl group-containing organopolysiloxane which has at least two silicon-bonded alkenyl groups per molecule, (B) organo-hydrogen polysiloxane which has at least two silicon-bonded hydrogen atoms per molecule, (C) silica-titania composite oxide particles at $\geq 3$ mass % of the total mass of the composition, and (D) a curing catalyst.

17 Claims, No Drawings

CURABLE SILICONE COMPOSITION, ENCAPSULANT AND OPTICAL SEMICONDUCTOR DEVICE

CROSS-REFERENCE TO RELATED APPLICATIONS

This application claims priority pursuant to 35 U.S.C. 119(a) to Japanese Application No. 2021-141244, filed Aug. 31, 2021, which application is incorporated herein by reference in its entirety.

DESCRIPTION

Technical Field

The present invention relates to curable silicone compositions, and more specifically it relates to curable silicone compositions which can be favorably used in optical semiconductor sealing material. The present invention also relates to optical semiconductor devices sealed with sealing material comprising such a hardened curable silicone composition.

Background Art

Curable silicone compositions are employed in a wide variety of industrial fields because on hardening they form hardened material with outstanding heat resistance, cold resistance, electrical insulating properties, weather resistance, water repellence and transparency. In particular, the hardened material is widely used as silicone sealing material used for optical members, and especially used in optical semiconductor devices such as light-emitting diodes (LEDs), because it is less likely than other organic materials to change color, and there is little decrease in physical properties such as durability.

In recent years, silicone sealing materials used in optical semiconductor devices such as light-emitting diodes (LEDs) are required to have high transparency and a high refractive index in order to achieve higher light extraction efficiency.

For example, Patent Document 1 discloses a hydrosilylation-curable organopolysiloxane composition comprising (A) methyl-phenyl-alkenyl polysiloxane which has at least two silicon-bonded alkenyl groups per molecule, in which diphenylsiloxane units are ≤5 mol % of total siloxane units, and at least 20 mol % of all silicon-bonded organic groups are phenyl groups, (B) methyl-phenyl-hydrogen polysiloxane which has at least two silicon-bonded hydrogen atoms per molecule, in which diphenylsiloxane units are ≤5 mol % of total siloxane units and at least 20 mol % of all silicon-bonded organic groups are phenyl groups, and (C) a hydrosilylation reaction catalyst, characterized in that in this composition diphenylsiloxane units are ≤5 mol % of total siloxane units.

In addition, Patent Document 2 discloses a silicone resin composition which is a silicone resin composition covering the light transmitting surface of a light-emitting diode, which contains a liquid constituent which includes a straight-chain organopolysiloxane constituent represented by general formula (I) and an organohydrogen polysiloxane constituent with ≥2 SiH groups in the molecule, represented by the following average compositional formula (2) $H_c(R^4)_d SiO_{(4-c-d)/2}$ (2) (In the formula, each $R^4$ is, independently, a monovalent hydrocarbon group which is unsubstituted or is substituted with a halogen atom or a cyano group and does not contain an aliphatic unsaturated bond, and c and d are numbers satisfying 0.001≤c≤2, 0.7≤d≤2 and 0.8≤c+d≤3.), and a platinum-group metal catalyst, where, in the aforementioned straight-chain organopolysiloxane constituent, the proportion of organosiloxane of molecular weight ≤1000 is <10%, and the content of organosiloxane of molecular weight ≤1000 is <10%, which gives hardened material with a Shore 00 hardness of ≤85.

And Patent Document 3 discloses a curable organopolysiloxane composition which comprises at least (A) a branched-chain organopolysiloxane which has at least three alkenyl groups per molecule, and in which at least 30 mol % of the total silicon-bonded organic groups are aryl groups, (B) a straight-chain organopolysiloxane with aryl groups, terminating with a diorgano-hydrogen-siloxane group at both ends of the molecule {the quantity of hydrogen atoms bound to a silicon atom in this constituent is 0.5-2 mol per mol of alkenyl groups in constituents in constituent (A)}, (C) a branched chain organopolysiloxane which has at least three diorgano-hydrogen-siloxane groups per molecule, in which at least 15 mol % of the total silicon-bonded organic groups are aryl groups {the quantity of diorgano-hydrogen-siloxane groups in this constituent is 1-20 mol % of the total quantity of diorgano-hydrogen-siloxane groups included in aforementioned constituent (B) and in this constituent} and (D) a hydrosilylation reaction catalyst (a quantity which promotes hardening of this composition).

In addition, Patent Document 4 discloses a curable composition which includes (A) organopolysiloxane which has the average compositional formula in chemical formula 1 below, and (B) organopolysiloxane which includes alkenyl groups, epoxy groups and aryl groups [Chemical Formula 1] $(R^1R^2_2SiO_{1/2})_a$ $(R^3R^4SiO_{2/2})_b$ $(R^5SiO_{3/2})_c$ $(SiO_2)_d$ (In chemical formula 1 above, $R^1$ is a C≥2 monovalent hydrocarbon group, $R^2$ is a C1-4 alkyl group, $R^3$ and $R^4$ are respectively, independently, a C1-20 alkyl group and a C2-20 alkenyl group or a C6-25 aryl group, $R^5$ is a C1-20 alkyl group or a C6-25 aryl group, at least one of $R^1$, $R^3$ and $R^4$ is an alkenyl group, a is a positive number, b is 0 or a positive number, c is a positive number, d is 0 or a positive number, b/a is ≥5, and b/c is ≥5).

However with prior curable silicone compositions there is the problem that, because the curable silicone compositions are not sufficiently thixotropic when a suitable quantity is applied by using a dispenser to an optical semiconductor on a supporting substrate, and then an attempt is made to bring about curing, the applied curable silicone composition may end up flowing so that hardened material with the intended shape is not obtained. And when particles of silica, etc., are added in order to improve thixotropy, there is the problem that the transparency of the resulting hardened material may be lowered.

PRIOR ART DOCUMENTS

Patent Documents

[Patent Document 1] JP 2012-507582 A
[Patent Document 2] JP 2014-159586 A
[Patent Document 3] JP 2010-1336 A
[Patent Document 4] JP 2015-507025 A

SYNOPSIS OF THE INVENTION

Problem which the Invention is Intended to Solve

The object of the present invention is to offer curable silicone compositions with high thixotropy, refractive index and hardness, which can form hardened material which shows outstanding transparency.

Another object of the present invention is to offer sealing material which includes a curable silicone composition of the present invention. And a further object of the present invention is to offer optical semiconductor devices sealed with a sealing material of the present invention.

Means for Solving the Problem

As a result of concerted studies in order to solve the problem above, the present inventors arrived at the present invention with the discovery that, surprisingly, on using a specified quantity of particles of a silica-titania composite oxide as a filler, the curable silicone composition shows outstanding thixotropy ideal for forming the desired shape, and it can form hardened material which has an outstanding refractive index, hardness and transparency.

Therefore the present invention relates to curable silicone compositions which include
alkenyl group-containing organopolysiloxane which has at least two silicon-bonded alkenyl groups per molecule,
(B) organo-hydrogen polysiloxane which has at least two silicon-bonded hydrogen atoms per molecule,
(C) silica-titania composite oxide particles at ≥3 mass % of the total mass of the composition, and
(D) a curing catalyst.

The specific surface area of the silica-titania composite oxide particles (C) is preferably ≥50 m²/g.

The refractive index of wavelength 589 nm of the silica-titania composite oxide particles (C) at 25° C. is preferably ≥1.40.

A curable silicone composition of the present invention preferably has a refractive index of wavelength 589 nm at 25° C. of ≥1.50.

The alkenyl-group-containing organopolysiloxane (A) preferably includes a resin organopolysiloxane, a straight-chain organopolysiloxane or both, in which the quantity of aryl groups among all silicon-bonded functional groups is ≥20 mol %.

A curable silicone composition of the present invention preferably has a viscosity at 25° C. of ≤30 Pa·s.

The present invention also relates to sealing material from a curable silicone composition of the present invention.

The present invention also relates to optical semiconductor devices provided with sealing material according to the present invention.

Effects of the Invention

With curable silicone compositions of the present invention it is possible to offer curable silicone compositions which can form hardened material with outstanding transparency, hardness and refractive index, while maintaining a thixotropy ideal for forming the desired shape when applied.

MODE FOR CARRYING OUT THE INVENTION

[Curable Silicone Composition]

A curable silicone composition of the present invention includes at least
alkenyl group-containing organopolysiloxane which has at least two silicon-bonded alkenyl groups per molecule,
(B) organo-hydrogen polysiloxane which has at least two silicon-bonded hydrogen atoms per molecule,
(C) silica-titania composite oxide particles at ≥3 mass % of the total mass of the composition, and
(D) a curing catalyst.

Each of the constituents of a curable silicone composition of the present invention is described in detail below.

Alkenyl group-containing organopolysiloxane which has at least two silicon-bonded alkenyl groups per molecule Constituent (A) is the principal constituent of a composition of the present invention, and is curable organopolysiloxane which has at least two alkenyl groups per molecule. A curable silicone composition of the present invention can include one type of alkenyl-group-containing organopolysiloxane (A), or can include two or more types of alkenyl-group-containing organopolysiloxane (A).

Examples of the molecular structure of constituent (A) include a straight-chain, partially branched straight chain, branched-chain, resinous, cyclic and three-dimensional network structure. Constituent (A) can be organopolysiloxane having one of these molecular structures, or can be organopolysiloxane having two or more of these molecular structures. A curable silicone composition of the present invention preferably includes both straight-chain alkenyl-group-containing organopolysiloxane and resinous alkenyl-group-containing organopolysiloxane as constituent (A). In this specification, resinous means having a branching or three-dimensional network structure in the molecular structure.

Examples of alkenyl groups which can be included in constituent (A) include C2-12 alkenyl groups such as vinyl groups, allyl groups, butenyl groups, pentenyl groups, hexenyl groups, heptenyl groups, octenyl groups, nonenyl groups, decenyl groups, undecenyl groups and dodecenyl groups, vinyl groups are preferred.

Silicon-bonded groups other than an alkenyl group included in constituent (A) include halogen-substituted or unsubstituted monovalent hydrocarbon groups other than alkenyl groups; examples include C1-12 alkenyl groups such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups and dodecyl groups, C6-20 aryl groups such as phenyl groups, tolyl groups, xylyl groups and naphthyl groups, C7-20 aralkyl groups such as benzyl groups, phenethyl groups and phenylpropyl groups, these groups in which some or all of the hydrogen atoms are substituted with a halogen atom such as a fluorine atom, chlorine atom or bromine atom. It should be noted that the silicon atoms in constituent (A) can also have a small quantity of hydroxyl groups or alkoxy groups such as methoxy groups or ethoxy groups within ranges which will not detract from the purpose of the present invention. The groups other than alkenyl groups bound to the silicon atoms of constituent (A) are preferably selected from C1-6 alkyl groups, and especially methyl groups, and/or C6-20 aryl groups, and especially phenyl groups.

In one embodiment of the present invention, constituent (A) can include a resinous alkenyl-group-containing organopolysiloxane, as constituent (A-1). The resinous alkenyl-group-containing organopolysiloxane constituent (A-1) is preferably represented by

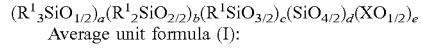
Average unit formula (I):

(In Formula (I), the $R^1$ groups are the same or different halogen-substituted or unsubstituted monovalent hydrocarbon groups, however, in one molecule at least two $R^1$s are alkenyl groups; 0≤a<1, 0≤b<1, 0≤c<0.9, 0≤d<0.5, and 0≤e<0.4, a+b+c+d=1.0, and c+d>0).

Examples of halogen-substituted or unsubstituted monovalent hydrocarbon groups as $R^1$ in Formula (I) above include C1-12 alkenyl groups such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups and dodecyl groups, C6-20 aryl groups such as phenyl groups, tolyl groups, xylyl groups and naphthyl groups, C7-20 aralkyl groups such as benzyl groups, phenethyl groups and phenylpropyl groups, C2-12 alkenyl groups such as vinyl groups, allyl groups, butenyl groups, pentenyl groups, hexenyl groups, heptenyl groups, octenyl groups, nonenyl groups, decenyl groups, undecenyl groups and dodecenyl groups, and these groups in which some or all of the hydrogen atoms are substituted with a halogen atom such as a fluorine atom, chlorine atom or bromine atom. $R^1$ can be a small quantity of hydroxyl groups or alkoxy groups such as methoxy groups or ethoxy groups within ranges which will not detract from the purpose of the present invention. Each $R^1$ is preferably selected from C1-6 alkyl groups and especially a methyl group, C2-6 alkenyl groups and especially a vinyl group, and/or C6-20 aryl groups and especially a phenyl group.

X in Formula (I) above is a hydrogen group or an alkyl group. X as an alkyl group is preferably a C1-3 alkyl group, and specific examples are a methyl group, ethyl group and propyl group.

In Formula (1) above, a is preferably in the range 0.05≤a≤0.8, more preferably in the range 0.1≤a≤0.6, and even more preferably in the range 0.15≤a≤0.4. In Formula (I) above, b is preferably in the range 0≤b≤0.6, more preferably in the range 0≤b≤0.4, and especially in the range 0≤b≤0.2. In Formula (I) above, c is preferably in the range 0.2≤c≤0.9, more preferably in the range 0.3≤c≤0.85, and especially in the range 0.4≤c≤0.8. In Formula (I) above, d is preferably in the range 0≤d≤0.4, more preferably in the range 0≤d≤0.25, and especially in the range 0≤d≤0.1. In Formula (I) above, e is preferably in the range 0≤e≤0.15, more preferably in the range 0≤e≤0.1, and especially in the range 0≤e≤0.05.

In a preferred embodiment of the present invention, c in Formula (I) is >0, i.e., the resinous alkenyl-group-containing organopolysiloxane constituent (A-1) includes a siloxane unit represented by $SiO_{3/2}$ (T unit). The resinous organopolysiloxane constituent (A-1) can include or not include, but preferably does not include, a siloxane unit represented by $SiO_{4/2}$ (Q unit).

In a preferred embodiment of the present invention, the resinous alkenyl-group-containing organopolysiloxane constituent (A-1) contains a terminal alkenyl group. The resinous alkenyl-group-containing organopolysiloxane constituent (A-1) preferably has an alkenyl group in a siloxane unit represented by $SiO_{1/2}$ (M units), and can include or not include, but preferably does not include, an alkenyl group in molecular side-chains (i.e. a siloxane unit represented by $SiO_{2/2}$ (D unit) or a siloxane unit represented by $SiO_{3/2}$ (T unit)).

Although there are no particular restrictions as to the content of alkenyl groups in the total silicon-bonded organic groups in resinous alkenyl-group-containing organopolysiloxane constituent (A-1), for example, it can be ≥3 mol % of total silicon-bonded organic groups and is preferably ≥5 mol %, and more preferably ≥8 mol %, it can also be ≤40 mol % of the total silicon-bonded organic groups and is preferably ≤30 mol %, and more preferably ≤20 mol %. It should be noted that the content of alkenyl groups can be found, for example, by an analytical method such as Fourier transform infrared spectrometry (FT-IR) or nuclear magnetic resonance (NMR), or by the titration method below.

A method for determining the quantity of alkenyl groups in each constituent will be described. The content of alkenyl groups in organopolysiloxane constituents can be determined with good precision by a titration method commonly known as the Wijs method. The principle is as follows. Firstly the alkenyl groups in the organopolysiloxane starting material are subjected to an addition reaction with iodine monochloride as shown in Formula (1). Then excess iodine monochloride is reacted with potassium chloride to liberate free iodine by the reaction shown in Formula (2). The free iodine is then titrated with sodium thio sulfate.

Formula (1)

Formula (2)

The quantity of alkenyl groups in the constituent can be determined from the difference between the quantity of sodium thio sulfate required in the titration, and the quantity for titrating a separately prepared blank solution.

In a preferred embodiment of the present invention, the resinous alkenyl-group-containing organopolysiloxane constituent (A-1) includes (an) aryl group(s) among the silicon-bonded organic groups. Thus, in Formula (I) above, at least one $R^1$ can be an aryl group. In a preferred embodiment of the present invention, the resinous alkenyl-group-containing organopolysiloxane constituent (A-1) has silicon-bonded aryl groups in a molecular side-chain, i.e. D unit and/or T unit, and particularly preferably contains silicon-bonded aryl groups only in a T unit. The resinous alkenyl-group-containing organopolysiloxane constituent (A-1) can include or not include, but preferably does not include, an aryl group at the end of the molecule, i.e. in an M unit. It should be noted that aryl groups are C6-20 aryl groups, and especially a phenyl group, tolyl group, xylyl group and naphthyl group.

When the resinous organopolysiloxane constituent (A-1) contains aryl groups, the content thereof (mol % of aryl groups in total of the silicon-bonded functional groups in the resin organopolysiloxane) can be designed as desired, but it can be ordinarily ≥5 mol %, and preferably ≥10 mol %, more preferably ≥15 mol %, even more preferably at ≥20 mol %, and particularly preferably ≥25 mol %; it can also be ordinarily ≤70 mol %, and is preferably ≤60 mol %, and more preferably ≤55 mol %. It should be noted that the aryl group content can be found, for example, by an analytical method such as Fourier transform infrared spectrometry (FT-IR) or nuclear magnetic resonance (NMR).

A resinous alkenyl-group-containing organopolysiloxane constituent (A-1) is preferably a solid or semisolid at 25° C. Although there are no particular restrictions as to the molecular weight of a resinous alkenyl-group-containing organo-polysiloxane constituent (A-1), it can be in the range 500-10,000.

When constituent (A) includes one resinous alkenyl-group-containing organopolysiloxane constituent (A-1), there are no particular restrictions as to the content thereof, but preferably, based on the total mass of the curable silicone composition of the present invention, it is ≥20 mass %, more preferably ≥30 mass %, even more preferably ≥40 mass %, and particularly preferably ≥50 mass %. In addition, preferably the content of constituent (A-1) based on the total mass of all organopolysiloxane constituents is ≤90 mass %, more preferably ≤80 mass %, even more preferably ≤75 mass %, and particularly preferably ≤70 mass %.

In one embodiment of the present invention, when it includes two resinous alkenyl-group-containing organopolysiloxane constituents (A-1), it can include a resinous alkenyl-group-containing organopolysiloxane monomer comprising only one T unit as the second constituent (A-1). Although there are no particular restrictions as to the content of such a second constituent (A-1), preferably based on the total mass of the curable silicone composition of the present invention, it is ≥1 mass %, more preferably ≥2 mass %, even more preferably ≥3 mass %; it can also be preferably ≤10 mass %, more preferably ≤7 mass %, and even more preferably ≤5 mass %.

Constituent (A) can include a straight-chain alkenyl-group-containing organopolysiloxane as constituent (A-2). A straight-chain alkenyl-group-containing organopolysiloxane constituent (A-2) can preferably be represented by

 Average structural formula (II):

(In Formula (II), the $R^2$ groups are the same or different halogen-substituted or unsubstituted monovalent hydrocarbon group(s), however, in one molecule at least two $R^2$s are alkenyl groups, and m is 1-500).

In Formula (II) above, the halogen-substituted or unsubstituted monovalent hydrocarbon groups $R^2$ can be the same as in Formula (I) above.

In Formula (II) above, m is preferably 2-300, more preferably 5-200, even more preferably 10-100, and particularly preferably 15-50.

Examples of such constituents (A-2) include dimethyl polysiloxane with both ends of the molecular chain terminated with dimethylvinylsiloxy groups, dimethyl polysiloxane with both ends of the molecular chain terminated with diphenylvinylsiloxy groups, a dimethyl-siloxane/methylphenylsiloxane copolymer with both ends of the molecular chain terminated with dimethylvinylsiloxy groups, a dimethylsiloxane/diphenylsiloxane copolymer with both ends of the molecular chain terminated with dimethylvinylsiloxy groups, a dimethyl-siloxane/methyl-phenyl-siloxane copolymer with both ends of the molecular chain terminated with diphenylvinylsiloxy groups, a dimethyl-siloxane/methylvinyl-siloxane copolymer with both ends of the molecular chain terminated with dimethylvinylsiloxy groups, a dimethyl-siloxane/methyl-phenyl-siloxane/methyl-vinyl-siloxane copolymer with both ends of the molecular chain terminated with dimethylvinylsiloxy groups, a dimethylsiloxane/diphenyl-siloxane/methyl-vinyl-siloxane copolymer with both ends of the molecular chain terminated with dimethylvinylsiloxy groups, methyl-vinylsiloxane with both ends of the molecular chain terminated with trimethylsiloxy groups, a dimethyl-siloxane/methyl-phenylsiloxane copolymer with both ends of the molecular chain terminated with trimethylsiloxy groups, a methylvinylsiloxane/diphenyl-siloxane copolymer with both ends of the molecular chain terminated with trimethylsiloxy groups, and a dimethylsiloxane/methylvinylsiloxane copolymer with both ends of the molecular chain terminated with trimethylsiloxy groups.

In a preferred embodiment of the present invention, a straight-chain alkenyl-group-containing organopolysiloxane constituent (A-2) contains an alkenyl group at both ends of the molecular chain, and can be a straight-chain organopolysiloxane with both ends of the molecular chain terminated with an alkenyl group. A straight-chain alkenyl-group-containing organopolysiloxane constituent (A-2) can include or not include, but preferably does not include, an alkenyl group in a molecular side-chain (i.e. D unit).

The content of alkenyl groups included in a straight-chain alkenyl-group-containing organopolysiloxane constituent (A-2) (mol % of alkenyl groups in the total of the silicon-bonded organic groups in the straight-chain organopolysiloxane) can be designed as desired, but it is ordinarily ≥1 mol %, and is preferably ≥2 mol %, and more preferably ≥3 mol %; it can also be ≤20 mol %, and is preferably ≤15 mol %, more preferably ≤10 mol %, and predominantly ≤7 mol %. It should be noted that the content of alkenyl groups can be found, for example, by analysis such as Fourier transform infrared spectrometry (FT-IR), nuclear magnetic resonance (NMR), and the titration method described above.

In one embodiment of the present invention, a straight-chain organopolysiloxane constituent (A-2) includes aryl groups in the silicon-bonded organic groups. Thus, in Formula (II) above, at least one $R^2$ can be an aryl group. In a preferred embodiment of the present invention, a straight-chain alkenyl-group-containing organopolysiloxane constituent (A-2) contains silicon-bonded aryl groups in a molecular side-chain. The straight-chain alkenyl-group-containing organo-polysiloxane constituent (A-2) can include or not include, but preferably does not include, an aryl group at the end of the molecular chain (i.e. M unit).

When a straight-chain alkenyl-group-containing organopolysiloxane constituent (A-2) contains aryl groups, the content thereof (mol % of alkenyl groups in total silicon-bonded functional groups in the straight-chain organopolysiloxane) can be designed as desired, but it is ordinarily ≥15 mol %, and is preferably ≥25 mol %, more preferably ≥30 mol %, and even more preferably ≥35 mol %; it can also be ≤75 mol %, and is preferably ≤65 mol %, more preferably ≤60 mol %, predominantly ≤55 mol %, and particularly preferably ≤50 mol %. It should be noted that the content of aryl groups can be found, for example, by an analytical method such as Fourier transform infrared spectrometry (FT-IR) or nuclear magnetic resonance (NMR).

When constituent (A) includes a straight-chain organopolysiloxane constituent (A-2), there are no particular restrictions as to the content thereof, but it is preferably, based on the total mass of the curable silicone composition of the present invention, ≥1 mass %, more preferably ≥2 mass %, even more preferably ≥3 mass %. And preferably the content of constituent (A-2), based on the total mass of the curable silicone composition of the present invention, is ≤20 mass %, more preferably ≤15 mass %, even more preferably ≤10 mass %, and particularly preferably ≤5 mass %.

In a preferred embodiment, constituent (A) includes an alkenyl-group-containing organopolysiloxane which includes many aryl groups among silicon-bonded functional groups and specifically which includes a resinous organopolysiloxane (A-1) in which the quantity of aryl groups among total silicon-bonded functional groups is ≥20 mol % and preferably 25 mol %, a straight-chain organopolysiloxane (A-2), or both.

Other alkenyl-group-containing organopolysiloxane constituents

A curable silicone composition of the present invention can also include, as other alkenyl-group-containing organopolysiloxane constituents, epoxy-group-containing organopolysiloxane (A-3) and/or cyclic organopolysiloxane (A-4).

Examples of the molecular structure of epoxy-group-containing organopolysiloxane (A-3) include a straight chain, partially branched straight chain, branched-chain, resinous, cyclic and three-dimensional network structure. Preferably, it is a resinous epoxy-group-containing organopolysiloxane. A curable silicone composition of the present invention can include one epoxy-group-containing organopolysiloxane, or can include two or more epoxy-group-containing organo-polysiloxanes.

A resinous epoxy-group-containing organopolysiloxane is preferably represented by average unit formula (IV) below:

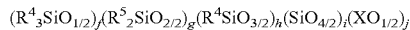

$(R^4{}_3SiO_{1/2})_f(R^5{}_2SiO_{2/2})_g(R^4SiO_{3/2})_h(SiO_{4/2})_i(XO_{1/2})_j$

{In Formula (IV), each $R^4$ is, independently, a halogen-substituted or unsubstituted monovalent hydrocarbon group, however, at least two $R^4$s are alkenyl groups; each $R^5$ is, independently, a halogen-substituted or unsubstituted monovalent hydrocarbon group or an epoxy-group-containing organic group, however, at least one $R^5$ is an epoxy-containing organic group, and X is a hydrogen atom or an alkyl group; $0 \leq f < 1$, $0 < g < 1$, $0 \leq h < 0.9$, $0 \leq i < 0.5$, and $0 < j < 0.5$, $f+g+h+i+j=1.0$, $h+i>0$, and, $j/(f+g+h+i+j)>0.05$}.

In Formula (IV) above, the halogen-substituted or unsubstituted monovalent hydrocarbon groups $R^4$ and $R^5$ are preferably selected from C1-12 alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups and dodecyl groups, C6-20 aryl groups such as phenyl groups, tolyl groups, xylyl groups and naphthyl groups, C2-12 alkenyl groups such as vinyl groups, allyl groups, butenyl groups, pentenyl groups, hexenyl groups, heptenyl groups, octenyl groups, nonenyl groups, decenyl groups, undecenyl groups and dodecenyl groups, and these groups in which some or all of the hydrogen atoms are substituted with a halogen atom such as a fluorine atom, chlorine atom or bromine atom. $R^4$ is preferably selected from C1-6 alkyl groups, and especially a methyl group, C2-6 alkenyl groups, and especially a vinyl group and/or C6-20 aryl groups, and especially a phenyl group.

Epoxy-containing organic groups $R^5$ in Formula (IV) above include, for example, glycidoxyalkyl groups such as a 2-glycidoxyethyl group, 3-glycidoxypropyl group and 4-glycidoxybutyl group, epoxycycloalkylalkyl groups such as a 2-(3,4-epoxycyclohexyl)ethyl group and 3-(3,4-epoxycyclohexyl)propyl group, and epoxyalkyl groups such as a 3,4-epoxybutyl group and 7,8-epoxyoctyl group, and it is preferably a glycidoxyalkyl group, and particularly preferably it is a 3-glycidoxypropyl group. $R^5$ is preferably selected from C1-6 alkyl groups and especially a methyl group, C2-6 alkenyl groups and especially a vinyl group, C6-20 aryl groups and especially a phenyl group, and a 3-glycidoxypropyl group. $R^5$ is preferably selected from C1-6 alkyl groups and especially a methyl group, and a 3-glycidoxypropyl group.

X in Formula (IV) above is a hydrogen group or an alkyl group. X as an alkyl group is preferably a C1-3 alkyl group, and specific examples are a methyl group, ethyl group and propyl group.

In Formula (IV) above, with $f+g+h+i+j=1.0$ as the criterion, f is preferably in the range $0.03 \leq f \leq 0.7$, more preferably in the range $0.06 \leq f \leq 0.5$, and even more preferably in the range $0.09 \leq f \leq 0.3$. In Formula (IV) above, g is preferably in the range $0.05 \leq g \leq 0.6$, more preferably in the range $0.1 \leq g \leq 0.4$, and especially in the range $0.2 \leq g \leq 0.3$. In Formula (IV) above, h is preferably in the range $0.1 \leq h \leq 0.8$, more preferably in the range $0.25 \leq h \leq 0.7$, and especially in the range $0.4 \leq h \leq 0.6$. In Formula (IV) above, i is preferably in the range $0 \leq i \leq 0.4$, more preferably in the range $0 \leq i \leq 0.25$, and especially in the range $0 \leq i \leq 0.1$. In Formula (IV) above, j is preferably in the range $0.05 \leq j \leq 0.4$, more preferably in the range $0.1 \leq j \leq 0.3$, and especially in the range $0.15 \leq j \leq 0.25$.

In one embodiment, in Formula (IV) above, $j/(f+g+h+i+j)$ is greater than 0.05. Preferably $j/(f+g+h+i+j)$ is greater than 0.08, more preferably greater than 0.11, and even more preferably greater than 0.14. In addition, $j/(f+g+h+i+j)$ is ordinarily smaller than 0.5, preferably smaller than 0.4, even more preferably smaller than 0.3, and particularly preferably smaller than 0.25.

In a preferred embodiment of the present invention, a resinous epoxy-group-containing organopolysiloxane includes a siloxane unit in which h in Formula (IV) above is greater than 0, i.e. it includes a siloxane unit represented by $SiO_{3/2}$ (T unit). The resinous epoxy-group-containing organopolysiloxane of constituent (C) can include or not include, but preferably does not include, a siloxane unit represented by $SiO_{4/2}$ (Q unit).

In a preferred embodiment of the present invention, an epoxy-group-containing organopolysiloxane contains an alkenyl group at the end of the molecule. The epoxy-group-containing organopolysiloxane preferably has an alkenyl group in a siloxane unit represented by $SiO_{1/2}$ (M unit); molecular side-chains (i.e. siloxane units represented by $SiO_{2/2}$ (D unit) and siloxane units represented by $SiO_{3/2}$ (T unit)) can include or not include, but preferably do not include, an alkenyl group.

In a preferred embodiment, although there are no particular restrictions as to the content of alkenyl groups in the total of the silicon-bonded organic groups in the epoxy-group-containing organopolysiloxane, it is preferably $\geq 1$ mol %, more preferably $\geq 3$ mol %, even more preferably $\geq 5$ mol %, and particularly preferably $\geq 7$ mol %; it can also be, for example, $\leq 30$ mol %, preferably $\leq 20$ mol %, and more preferably $\leq 15$ mol %.

In a preferred embodiment of the present invention, a resinous epoxy-group-containing organopolysiloxane includes aryl groups in the silicon-bonded organic groups. Thus, in Formula (IV) above, at least one of $R^4$ or $R^5$ can be an aryl group. In a preferred embodiment of the present invention, a resinous epoxy-group-containing organopolysiloxane contains silicon-bonded aryl groups in a molecular side-chain, i.e. D unit or T unit, preferably a T unit. The resinous epoxy-group-containing organopolysiloxane constituent can include or not include, but preferably does not include, an aryl group at the end of the molecule, i.e. the M units. It should be noted that aryl groups include C6-20 aryl groups such as a phenyl group, tolyl group, xylyl group and naphthyl group.

When an epoxy-group-containing organopolysiloxane constituent contains aryl groups, (the mol % of aryl groups in the total of the silicon-bonded functional groups in the epoxy-group-organopolysiloxane) can be designed as desired, but is preferably $\geq 15$ mol %, more preferably $\geq 20$ mol %, even more preferably $\geq 25$ mol %, and particularly preferably $\geq 30$ mol %; it is also preferably $\leq 70$ mol %, more preferably $\leq 60$ mol %, even more preferably $\leq 50$ mol %, and particularly preferably $\leq 40$ mol %.

Although there are no particular restrictions as to the content of epoxy-group-containing groups in total silicon-bonded organic groups in the epoxy-group-containing organopolysiloxane, it is preferably $\geq 1$ mol %, more preferably $\geq 5$ mol %, even more preferably $\geq 10$ mol %, and particularly preferably $\geq 15$ mol %; it can also be, for example, $\leq 40$ mol %, preferably $\leq 30$ mol %, and more preferably $\leq 25$ mol %. It should be noted that the content of epoxy-group-containing groups can be found, for example, by an analytical method such as Fourier transform infrared spectrometry (FT-IR) or nuclear magnetic resonance (NMR).

In a preferred embodiment of the present invention, an epoxy-group-containing organopolysiloxane includes a hydroxyl group and/or alkoxy group as an organic group bound to a silicon atom. Although there are no particular restrictions as to the content of hydroxyl groups and/or alkoxy groups in total silicon-bonded organic groups in the epoxy-group-containing organopolysiloxane, it is preferably ≥2 mol %, more preferably ≥5 mol %, and even more preferably ≥10 mol %; it is also, for example, ≤30 mol %, preferably ≤20 mol %, and more preferably ≤15 mol %. It should be noted that the content of hydroxyl groups and/or alkoxy groups can be found, for example, by an analytical method such as Fourier transform infrared spectrometry (FT-IR) or nuclear magnetic resonance (NMR).

Although there are no particular restrictions as to the viscosity of the resinous epoxy-group-containing organopolysiloxane, it is, for example, in the range 50 mPa·s to 20,000 mPa·s, and is preferably in the range 50 mPa·s to 3000 mPa·s at 25° C. The viscosity of the organopolysiloxane constituents in this specification can be measured with a rotary viscosimeter at 25° C. as in JIS K 7117-1.

Although there are no particular restrictions as to the quantity of epoxy-group-containing organopolysiloxane, and especially resinous epoxy-group-containing organopolysiloxane, based on the total mass of the curable silicone composition of the present invention it can include ≥0.5 mass %, more preferably ≥1 mass %, even more preferably ≥2 mass %; it can also include a quantity of ≤10 mass %, more preferably ≤7 mass %, even more preferably ≤5 mass %, and particularly preferably ≤4 mass %, based on the total mass of the curable silicone composition of the present invention.

A cyclic organopolysiloxane constituent (A-4) can preferably be represented by

 $(R^6{}_2SiO)_n$     Average structural formula (V):

(In Formula (V), the $R^6$ groups are the same or different halogen-substituted or unsubstituted monovalent hydrocarbon group(s), however, in one molecule at least two $R^6$s are alkenyl groups, and n is a number giving a viscosity at 25° C. of ≤1000 mPa·s).

The halogen-substituted or unsubstituted monovalent hydrocarbon group(s) $R^6$ in Formula (V) above can be the same as for $R^1$ in Formula (I) above.

In Formula (V) above, n is a number giving a viscosity at 25° C. of ≤1000 mPa·s; for example it is 4-15, it is preferably 4-10, and more preferably 4-8. It should be noted that the viscosity of the organopolysiloxane constituents in this specification can be measured with a rotary viscosimeter at 25° C. as in JIS K 7117-1.

In one embodiment, although the content of alkenyl groups included in the cyclic alkenyl-group-containing organopolysiloxane constituent (A-4) (mol % of alkenyl groups in total silicon-bonded organic groups in the cyclic organopolysiloxane) can be designed as desired, it is ordinarily ≥10 mol %, and is preferably ≥20 mol %, more preferably ≥30 mol %, and even more preferably ≥40 mol %, and predominantly ≥45 mol %; and it can be ≤80 mol %, and is preferably ≤70 mol %, more preferably ≤60 mol %, and predominantly ≤55 mol %. It should be noted that the content of alkenyl groups can be found, for example, by an analytical method such as Fourier transform infrared spectrometry (FT-IR) or nuclear magnetic resonance (NMR), and by the titration method described above.

Although there are no particular restrictions as to the content of cyclic organopolysiloxane, it can be ≥0.01 mass %, more preferably ≥0.05 mass %, even more preferably ≥0.1 mass %, and particularly preferably ≥0.15 mass %, based on the total mass of the curable silicone composition of the present invention. The content of cyclic organopolysiloxane is also preferably ≤10 mass %, more preferably ≤5 mass %, and particularly preferably ≤3 mass %, based on the total mass of the curable silicone composition of the present invention.

Although there are no particular restrictions as to the total content of constituent (A) it can be included at ≥40 mass %, more preferably ≥45 mass %, even more preferably ≥50 mass %, and particularly preferably ≥55 mass %, based on the total mass of the curable silicone composition of the present invention. In a favored embodiment, constituent (A) can be included at ≤90 mass %, more preferably ≤80 mass %, even more preferably ≤70 mass %, based on the total mass of the curable silicone composition of the present invention.

(B) Organo-Hydrogen Polysiloxane which has at Least Two Silicon-Bonded Hydrogen Atoms Per Molecule Constituent (B) acts in the curable silicone composition as a crosslinking agent, by means of a hydrosilylation curing reaction, and is an organo-hydrogen polysiloxane which has at least two silicon-bonded hydrogen atoms per molecule. A curable silicone composition of the present invention can include one organo-hydrogen polysiloxane (B) or can include two or more organo-hydrogen polysiloxanes (B).

Examples of the molecular structure of constituent (B) include a straight-chain, partially branched straight chain, branched-chain, resinous, cyclic and three-dimensional network structure. Constituent (B) can be one organo-hydrogen polysiloxane having such a molecular structure, or can be a mixture of two or more organo-hydrogen polysiloxanes having such a molecular structure. Preferably a curable silicone composition of the present invention includes both a straight-chain organo-hydrogen polysiloxane and a resinous organo-hydrogen polysiloxane as constituent (B).

Silicon-bonded groups other than silicon-bonded hydrogen atoms included in constituent (B) include halogen-substituted or unsubstituted monovalent hydrocarbon groups other than alkenyl groups, for example C1-12 alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups and dodecyl groups, C6-20 aryl groups such as phenyl groups, tolyl groups, xylyl groups and naphthyl groups, C7-20 aralkyl groups such as benzyl groups, phenethyl groups and phenylpropyl groups, and these groups in which some or all of the hydrogen atoms are substituted with a halogen atom such as a fluorine atom, chlorine atom or bromine atom. It should be noted that the silicon atoms in constituent (B) can have a small quantity of hydroxyl groups or alkoxy groups such as methoxy groups or ethoxy groups, within ranges which will not detract from the purpose of the present invention. Silicon-bonded groups other than silicon-bonded hydrogen atoms included in constituent (B) are preferably selected from C1-6 alkyl groups, and especially methyl groups, and C6-20 aryl groups, and especially phenyl groups.

In one embodiment of the present invention, constituent (B) can include a straight-chain organo-hydrogen polysiloxane as constituent (B-1). The straight-chain organo-hydrogen polysiloxane constituent (B-1) can preferably be represented by

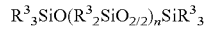 $R^3{}_3SiO(R^3{}_2SiO_{2/2})_nSiR^3{}_3$     Average structural formula (III):

(In Formula (III), each $R^3$ is a hydrogen atom or the same or different halogen-substituted or unsubstituted monovalent hydrocarbon group other than an alkenyl group, however, in one molecule at least two $R^4$s are hydrogen atoms; n is 1-100).

Halogen-substituted or unsubstituted monovalent hydrocarbon groups(s) other than alkenyl groups as $R^3$ in Formula (III) above include C1-12 alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups and dodecyl groups, C6-20 aryl groups such as phenyl groups, tolyl groups, xylyl groups and naphthyl groups, C7-20 aralkyl groups such as benzyl groups, phenethyl groups and phenylpropyl groups, and these groups in which some or all of the hydrogen atoms are substituted with a halogen atom such as a fluorine atom, chlorine atom or bromine atom. $R^3$ can be a small quantity of hydroxyl groups or alkoxy groups such as methoxy groups or ethoxy groups within ranges which will not detract from the purpose of the present invention. $R^3$ is preferably selected from a hydrogen atom, C1-6 alkyl groups, and especially methyl groups, or C6-20 aryl groups, and especially phenyl groups.

In Formula (III) above, m is preferably 1-50, more preferably 1-20, even more preferably 1-10, and particularly preferably 1-5.

In a preferred embodiment of the present invention, a straight-chain organo-hydrogen polysiloxane constituent (B-1) contains a silicon-bonded hydrogen atom bound at both ends of the molecule. The straight-chain organo-hydrogen polysiloxane constituent (B-1) has a silicon-bonded hydrogen atom in an M unit, and can include or not include, but preferably does not include, a silicon-bonded hydrogen atom in a D unit.

A straight-chain organo-hydrogen polysiloxane constituent (B-1) preferably contains silicon-bonded aryl groups in molecular side-chains. The straight-chain organopolysiloxane constituent (B-1) can include or not include, but preferably does not include, an aryl group in the end of the molecular chain. In a preferred embodiment, a straight-chain organo-hydrogen polysiloxane constituent (B-1) includes a structural unit represented by $Ar_2SiO_{2/2}$ (Ar here represents an aryl group), in which one silicon atom is substituted with two aryl groups.

In one embodiment of the present invention, when a straight-chain organo-hydrogen polysiloxane constituent (B-1) includes aryl groups, although there are no particular restrictions as to the content of aryl groups in total silicon-bonded organic groups, for example it is ≥10 mol % of the total silicon-bonded organic groups and is preferably ≥15 mol %, and more preferably ≥20 mol %; it can also be ≤50 mol % of the total silicon-bonded organic groups and is preferably ≤40 mol %, and more preferably ≤30 mol %. It should be noted that the content of aryl groups can be found, for example, by an analytical method such as Fourier transform infrared spectrometry (FT-IR) or nuclear magnetic resonance (NMR).

When constituent (B) includes a straight-chain organo-hydrogen polysiloxane constituent (B-1), although there are no particular restrictions as to the content thereof, it can be included at ≥5 mass %, more preferably ≥10 mass %, even more preferably ≥15 mass %, based on the total mass of the curable silicone composition of the present invention; it can also be included at ≤40 mass %, more preferably ≤30 mass %, even more preferably ≤25 mass %, based on the total mass of the curable silicone composition of the present invention.

In one embodiment of the present invention, constituent (B) can include a resinous organo-hydrogen polysiloxane as constituent (B-2). A resinous organo-hydrogen polysiloxane constituent (B-2) can preferably be represented by average unit formula (VI) below:

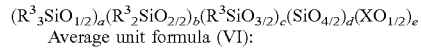
Average unit formula (VI):

(In Formula (VI), each $R^3$ is, independently, a hydrogen atom or the same or different halogen-substituted or unsubstituted monovalent hydrocarbon group; however, in one molecule at least two $R^3$s are hydrogen atoms; $0 \le a < 1$, $0 \le b < 1$, $0 \le c < 0.9$, $0 \le d < 0.7$, and $0 \le e < 0.4$, $a+b+c+d=1.0$, and $c+d>0$.

The halogen-substituted or unsubstituted monovalent hydrocarbon groups other than alkenyl groups of $R^3$ in Formula (VI) above can be the same as $R^3$ and X in Formula (III).

In Formula (VI) above, a is preferably in the range $0.1 \le a \le 0.9$, more preferably in the range $0.3 \le a \le 0.8$, and even more preferably in the range $0.5 \le a \le 0.7$. In Formula (VI) above, b is preferably in the range $0 \le b \le 0.5$, more preferably in the range $0 \le b \le 0.3$, and especially in the range $0 \le b \le 0.1$. In Formula (VI) above, c is preferably in the range $0.1 \le c \le 0.7$, more preferably in the range $0.2 \le c \le 0.6$, and especially in the range $0.3 \le c \le 0.5$. In Formula (VI) above, d is preferably in the range $0 \le d \le 0.5$, more preferably in the range $0 \le d \le 0.3$, and especially in the range $0 \le d \le 0.1$. In Formula (VI) above, e is preferably in the range $0 \le e \le 0.15$, more preferably in the range $0 \le e \le 0.1$, and especially in the range $0 \le e \le 0.05$.

In a preferred embodiment of the present invention, in a resinous organo-hydrogen polysiloxane constituent (B-2), c in Formula (VI) above is greater than 0, i.e. it includes a T unit. A resinous epoxy-group-containing organopolysiloxane of constituent (B) can include or not include, but preferably does not include, a Q unit.

In a preferred embodiment of the present invention, a resinous organo-hydrogen polysiloxane constituent (B-2) contains a silicon-bonded hydrogen atom at the end of the molecule. The resinous organo-hydrogen polysiloxane constituent (B-2) preferably has a silicon-bonded hydrogen atom in an M unit, and can include or not include, but preferably does not include a silicon-bonded hydrogen atom in a molecular side-chain (i.e. D units and T units).

When a resinous organo-hydrogen polysiloxane constituent (B-2) includes aryl groups, the content thereof (mol % of aryl groups in total silicon-bonded functional groups in the resinous organo-hydrogen polysiloxane) can be designed as desired, but it is ordinarily ≥1 mol %, preferably ≥5 mol %, more preferably ≥10 mol %, even more preferably ≥13 mol %, and particularly preferably ≥16 mol %. It can also be ≤50 mol %, and is preferably ≤40 mol %, more preferably ≤35 mol %, predominantly ≤30 mol %, and especially preferably ≤25 mol %.

In one embodiment of the present invention, a resinous organo-hydrogen polysiloxane constituent (B-2) can be in the solid or liquid state. It is preferably a liquid, and although there are no particular restrictions as to the viscosity thereof, at 25° C. and 20/s it is preferably in the range 1-100,000 mPa·s, more preferably it is in the range 2-50,000 mPa·s, and even more preferably it is in the range 3-10,000 mPa·s.

When a curable silicone composition of the present invention includes resinous organo-hydrogen polysiloxane, there are no particular restrictions as to the content thereof, but it is preferably ≥0.5 mass %, more preferably ≥1 mass %, and even more preferably ≥1.5 mass %, based on the total mass of the curable silicone composition of the present invention; it can also be included at ≤15 mass %, more preferably ≤10 mass %, and even more preferably ≤5 mass %.

Although there are no particular restrictions as to the content of constituent (B), it is preferably included at ≥5 mass %, more preferably ≥10 mass %, and even more preferably ≥15 mass %, based on the total mass of the curable silicone composition of the present invention. In a favored embodiment, constituent (B) can be included at ≤40 mass %, and preferably at ≤30 mass %, and more preferably it can be included at ≤25 mass %, based on the total mass of the curable silicone composition of the present invention.

In addition, in one embodiment of the present invention the ratio of silicon-bonded alkylene groups and silicon-bonded hydrogen atoms in constituent (B) is such that, in the curable silicone composition silicon-bonded hydrogen atoms are included at ≥0.3 mol, preferably ≥0.5 mol, and more preferably ≥0.7 mol to 1 mol of silicon-bonded alkenyl groups, and, for example, in the curable silicone composition hydrogen atoms can be included in a quantity of ≤5 mol, preferably ≤3 mol, more preferably ≤2 mol, even more preferably ≤1.5 mol, predominantly ≤1.2 mol, and particularly preferably 1.0 mol to 1 mol of silicon-bonded alkenyl groups.

(C) Silica-Titania Composite Oxide Particles

The silica-titania composite oxide particles of constituent (C) are composite oxide particles comprising a silica ($SiO_2$) constituent and a titanium oxide ($TiO_2$) constituent, and they can confer favorable thixotropy for the curable silicone composition of the present invention to form the desired shape, and in particular to form a dome shape. A curable silicone composition of the present invention can include one type of silica-titania composite oxide particles (C), or can include two or more types of silica-titania composite oxide particles (C).

Although there are no restrictions as to the average particle size of primary particles of the silica-titania composite oxide particles of constituent (C), for example, it is in the range 10-500 nm, and is preferably in the range 10-200 nm. The particle size of the silica-titania composite oxide particles in this specification can be found for example from the volumetric particle size distribution by SEM or TEM image analysis, etc.

Although there are no particular restrictions as to the specific surface area of the silica-titania composite oxide particles of constituent (C), it is preferably ≥25 m²/g, is more preferably ≥50 m²/g, and is even more preferably ≥75 m²/g; and it is also ordinarily ≤300 m²/g and is preferably ≤200 m²/g. The specific surface area of the silica-titania composite oxide particles in this specification can be measured for example by the BET nitrogen adsorption (1 point) method.

Although there are no particular restrictions as to the refractive index of the silica-titania composite oxide particles of constituent (C), for example, the refractive index for wavelength 589 nm (sodium D line) at 25° C. is ≥1.40, and it is preferably ≥1.43, and more preferably ≥1.46. It is also ordinarily ≤1.61, preferably ≤1.58, and more preferably ≤1.55. It should be noted that the refractive index of the silica-titania composite oxide particles can be grasped by dispersing particles of the silica-titania composite oxide in liquids of differing refractive index, and taking it to be equal to the refractive index of the liquid with the highest transmission at 589 nm.

Although there are no particular restrictions as to the compositional ratio of the silica constituent and the titanium oxide constituent in the silica-titania composite oxide particles of constituent (C), for example, the constituent of the titanium constituent as titania (titanium oxide) is preferably ≥0.01 mol %; it is also preferably ≤25 mol %, and more preferably ≤20 mol %. The content of the titanium constituent can be determined, for example, by X-ray fluorescence analysis.

Although there is no particular restriction as to the average circularity of the silica-titania composite oxide particles of constituent (C), it is ordinarily ≥0.80 and is preferably ≥0.85. Average circularity can be found for example by SEM or TEM image analysis, etc.

Although there are no particular restrictions as to the crystal form of the silica-titania composite oxide particles of constituent (C), they are preferably non-crystalline. And in one embodiment, in the silica-titania composite oxide particles of constituent (C), the proportion of the crystalline phase is preferably ≥5 mass %. The proportion of the crystalline phase in the silica-titania composite oxide particles can be found, for example, by XRD.

There are no particular restrictions as to the process for producing the silica-titania composite oxide particles of constituent (C), and they can be produced by a process known in the relevant technical field. Processes for producing silica-titania composite oxide particles include, for example, a sol-gel process and a flame-fusion process. In the sol-gel process, a liquid sol of pH≤2 containing silicon and titanium alkoxides, a water-soluble polymer, and acid and acetyl acetone at 40-200 mol % relative to titanium is prepared; this sol is subjected to phase separation due to spinodal decomposition, to produce a gel comprising an aggregation of spherical silica-titania composite oxide particles, and particles of a silica-titania composite oxide can be produced by triturating and drying this gel. And in the flame-fusion process, particles of a silica-titania composite oxide can be produced by combustion, by feeding starting material comprising a silicon compound and a titanium compound in a mixed gaseous state, into a flame.

Commercially available silica-titania composite oxide particles which can be used as constituent (C) in this invention include the SILFIL products produced by Tokuyama Corporation (specific surface area 100-200 g/m², refractive index 1.48, 1.51 or 1.53).

As for the content of silica-titania composite oxide particles of constituent (C) in the present invention, they can be included at ≥3 mass %, based on the total mass of the curable silicone composition of the present invention. Silica-titania composite oxide particles of constituent (C) are preferably included at ≥4.5 mass %, and more preferably they can be included at ≥6 mass %, based on the total mass of the curable silicone composition. In a favored embodiment, constituent (C) can be included at ≤30 mass %, preferably included at ≤25 mass %, and more preferably included at ≤20 mass %, based on the total mass of the curable silicone composition.

(D) A Curing Catalyst

The curing catalyst (D) is a curing catalyst using a hydrosilylation reaction, and is a catalyst for promoting hardening of a curable silicone composition of the present invention. Examples of such a constituent (D) include platinum-based catalysts such as chloroplatinic acid, an alcoholic solution of chloroplatinic acid, platinum-olefin complexes, a complex of platinum and 1,3-divinyl-1,1,3,3-tetramethyldisiloxane, and powders carrying platinum, palladium-based catalysts such as tetrakis(triphenylphosphine)palladium, palladium black and mixtures with triphenylphosphine, and also rhodium-based catalysts; particularly preferably it is a platinum-based catalyst.

The quantity of constituent (D) included is a catalytic amount; more specifically, when a platinum-based catalyst is used as constituent (D) the quantity of platinum atoms in the total mass of the curable silicone composition of the present invention is preferably ≥0.01 ppm, is more preferably 0.1 ppm, and is even more preferably ≥1 ppm, and the quantity of platinum atoms in the total mass of the curable silicone composition of the present invention is also preferably ≤20 ppm, is more preferably ≤15 ppm, is even more preferably ≤10 ppm, and can be a quantity of ≤5 ppm.

A curable silicone composition of the present invention can include discretionary constituents within ranges which will not detract from the effects of the present invention. Examples of such discretionary constituents include acetylene compounds, organophosphorus compounds, vinyl-group-containing siloxane compounds, inorganic fillers other than constituent (C), for example, inorganic fillers such as powdered quartz, silica, titanium oxide, magnesium carbonate, zinc oxide, iron oxide and diatomite, such inorganic fillers with the surface of the filler given a water-repellent treatment with an organosilicon compound, hydrosilylation suppressants, organopolysiloxanes which do not contain silicon-bound hydrogen atoms or silicon-bound alkenyl groups, adhesion-conferring agents different from constituent (E-1), agents conferring heat-resistance, agents conferring cold-resistance, heat-conducting fillers, fire-proofing agents, thixotropic agents, phosphors, and solvents. Such discretionary constituents are ordinarily added at 0.001-20 mass % of the entire composition.

As inorganic fillers, silica can be, for example, fumed silica, dry silica, wet silica, crystalline silica or precipitated silica, etc. Silica can also be given a water-repellent surface treatment with an organosilicon compound such as an organoalkoxysilane compound, organochlorosilane compound, organosilazane compound or low molecular-weight siloxane compound or a silane coupling agent or titanate-based coupling agent, etc.

Hydrosilylation suppressants are constituents for suppressing hydrosilylation of the curable silicone composition. Examples of such hydrosilylation suppressants include alkyl alcohols such as 2-methyl-3-butene-2-ol, 3,5-dimethyl-1-hexen-3-ol, 2-phenyl-3-buten-2-ol and 1-ethyl-1-cyclohexanol, enyne compounds such as 3-methyl-3-penten-1-yne and 3,5-dimethyl-3-hexen-1-yne, alkenyl-group-containing low-molecular-weight siloxanes such as tetramethyl-tetravinyl-cyclotetrasiloxane and tetramethyl-tetrahexenyl-cyclotetrasiloxane alkynyloxysilanes such as tris[1,1-dimethylpropynyl)oxy]methylsilane and tris[1,1-dimethylpropynyl)oxy]vinylsilane. The hydrosilylation suppressant is preferably selected from alkyl alcohols, and is particularly preferably 1-ethyl-1-cyclohexanol. The reaction suppressant is ordinarily added at 0.001-5 mass % of the entire composition.

Examples of phosphors include yellow, red, green and blue phosphors comprising oxide-based phosphors, oxynitride-based phosphors, nitride-based phosphors, sulfide-based phosphors, oxysulfide-based phosphors or fluoride-based phosphors, etc., and mixtures of at least two of these, widely employed in light-emitting diodes (LEDs). Oxide-based phosphors include, for example, cerium-ion-doped yttrium-aluminum-garnet-based green-yellow-light-emitting YAG phosphors, cerium-ion-doped terbium-aluminum-garnet-based yellow-light emitting TAG phosphors, and cerium- and europium-ion-doped silicate-based green-yellow-light-emitting phosphors. Oxynitride-based phosphors include, for example, europium-ion-doped silicon-aluminum-oxygen-nitrogen-based red-green-light-emitting SiAlON phosphors. Nitride-based phosphors include, for example, europium-ion-doped calcium-strontium-aluminum-silicon-nitrogen-based red-light-emitting CASN phosphors. Sulfide-based phosphors include, for example, copper ion- or aluminum ion-doped ZnS-based green-light-emitting phosphors. Oxysulfide-based phosphors include, for example, europium-ion-doped $Y_2O_2S$-based red-light-emitting phosphors. Fluoride-based phosphors include KSF phosphors ($K_2SiF_6:Mn^{4+}$).

Although there are no particular restrictions as to the viscosity of a curable silicone composition of the present invention, for example, when viscosity is measured using a viscoelasticity measuring device, at a measurement temperature of 25° C., with cone plates of cone diameter 40 mm and cone angle 2°, at a shear speed of 10/s, it is preferably ≤35 Pa·s, and more preferably ≤30 Pa·s.

A curable silicone composition of the present invention has outstandingly favorable thixotropy for forming given shapes, and especially dome shapes. For example, when the viscosity of curable silicone composition is measured using a viscoelasticity measuring device, at a measurement temperature of 25° C., with a cone plate of cone diameter 40 mm and cone angle 2°, rotating in the same direction at shear speeds of 1/s and 10/s, and the thixotropic index is the ratio of viscosity at (1/s)/(10/s), this thixotropic index is preferably greater than 3.0, more preferably greater than 3.2, even more preferably greater than 3.3, and particularly preferably greater than 3.4.

On hardening, a curable silicone composition of the present invention can form hardened material with good transparency. Specifically, the curable silicone composition of the present invention preferably has a transmission rate of ≥90% for light of wavelength 400 nm to wavelength 700 nm, and ≥95% is more preferred. It should be noted that the light transmission rate of a curable silicone composition of the present invention can be found, for example, by measuring hardened material of light path length 1 mm by using a spectrophotometer.

A curable silicone composition of the present invention has a high refractive index. For example, the refractive index of a curable silicone composition of the present invention for 589 nm at 25° C., measured by an Abbé refractometer, is preferably ≥1.48, and more preferably ≥1.50.

On hardening, a curable silicone composition of the present invention can form hardened material with high hardness. Preferably hardened materials obtained by hardening the curable silicone composition of the present invention preferably has a type D durometer hardness at 25° C. of ≥D50. It should be noted that this type D durometer hardness can be found with a type D durometer in accordance with JIS K 6253-1997 "Hardness testing methods for vulcanized rubber and thermoplastic rubber".

A curable silicone composition of the present invention can be prepared by mixing each of the constituents. The process for mixing the constituents can be a prior known process, without any particular restriction, but simple stirring will ordinarily give a uniform mixture. And when discretionary solid constituents such as inorganic fillers are included, mixing by using a mixing device is more preferred. There is no particular restriction as to such a mixing device, and examples include a single-screw or twin-screw continuous mixer, double rolls, a Ross mixer, a Hobart mixer, a dental mixer, a planetary mixer, a kneader mixer and a Henschel mixer.

[Sealing Material, Film]

The present invention also relates to sealing material for semiconductors using a curable silicone composition of the present invention. There is no particular restriction as to the shape of sealing material of the present invention, but it is preferably in the form of a dome in the form of a sheet. There is no restriction as to the semiconductor sealed by a sealing material or film of the present invention, examples include semiconductors such as SiC and GaN, and especially optical semiconductors such as power semiconductors or light-emitting diodes.

In the case of sealing material of the present invention, a curable silicone composition of the present invention which shows outstanding thixotropy is used, and hence it is possible to offer sealing material which can form sealing material of a desired shape, and especially dome-shaped sealing material, which also has outstanding hardness, refractive index and transparency.

[Optical Semiconductor Element]

The present invention also relates to optical semiconductor elements provided with sealing material of the present invention. The optical semiconductor element can be, for example, a light-emitting diode (LED), semiconductor laser, photodiode, phototransistor, solid-state imaging element, photocoupler light-emitting element or photoreceptor; it is particularly preferably a light-emitting diode (LED).

A light-emitting diode (LED) emits light from above, below, left and right of the optical semiconductor element, and hence the components constituting the light-emitting diode (LED) preferably do not absorb light, and are preferably materials with high light transmission or high reflectance. Therefore, the substrate on which the optical semiconductor element is mounted is also preferably a material with high light transmission or high reflectance. Such substrates on which optical semiconductor elements are mounted include, for example, electrically conductive metals such as silver, gold and copper, non-electrically conductive metals such as aluminum and nickel, thermoplastic resins such as PPA and LCP mixed with a white pigment, thermosetting resins such as epoxy resins, BT resins, polyimide resins, and silicone resins containing a white pigment, and ceramics such as alumina and alumina-nitride.

Optical semiconductor elements of the present invention are sealed by a sealing material of the present invention, and hence have outstanding reliability and light extraction efficiency.

EXAMPLES

Curable silicone compositions of the present invention are described in detail below by means of practical examples and comparative examples.

The different constituents were mixed to give the compositions shown in the table (parts by mass), to prepare curable silicone compositions. It should be noted below that Me represents a methyl group, Vi represents a vinyl group, Ph represents a phenyl group, and Ep represents a 3-glycidoxypropyl group. In addition, in the table the structure of the organopolysiloxane constituents is presented in an abbreviated form, and functional groups other than Me in the M, D or T units are shown in brackets. In addition, H/Vi shows the molar ratio of silicon-bonded hydrogen atoms (H) and vinyl groups (Vi) in the organopolysiloxane constituent.

The quantity of curing catalyst constituent d is shown as the quantity of platinum atoms (ppm).

(Constituent a: Alkenyl-group-containing organopolysiloxane)

Constituent a-1: Resinous alkenyl-group-containing organopolysiloxane represented by average unit formula $(Me_3SiO_{1/2})_5 (ViMe_2SiO_{1/2})_{17} (MeSiO_{3/2})_{39} (PhSiO_{3/2})_{39}$ Constituent a-2: Resinous alkenyl-group-containing organopolysiloxane represented by average unit formula $(Me_3SiO_{1/2})_{14} (ViMe_2SiO_{1/2})_{11} (MeSiO_{3/2})_{53} (PhSiO_{3/2})_{22}$ Constituent a-3: Resinous alkenyl-group-containing organopolysiloxane represented by average structural formula $(ViMe_2SiO_{1/2})_3 (PhSiO_{3/2})$ Constituent a-4: Straight-chain alkenyl-group-containing organopolysiloxane represented by average structural formula $ViMe_2SiO (Ph_2SiO)_{20} SiMe_2Vi$ Constituent a-5: Straight-chain alkenyl-group-containing organopolysiloxane represented by average structural formula $ViMe_2SiO (Me_2SiO)_{60} (Ph_2SiO)_{30} SiMe_2Vi$ Constituent a-6: Resinous alkenyl-group-containing organopolysiloxane represented by average structural formula $(ViMe_2SiO_{1/2})_{25} (PhSiO_{3/2})_{75}$ Constituent a-7: Cyclic alkenyl-group-containing organopolysiloxane represented by average unit formula $(ViMeSiO_{2/2})_4$ Constituent a-8: Epoxy-group-containing organopolysiloxane represented by average unit formula $(ViMe_2SiO_{1/2})_{13} (EpMeSiO_{2/2})_{24} (PhSiO_{3/2})_{46} (OMe)_{17}$ (Constituent b: Organo-hydrogen polysiloxane)

Constituent b-1: Straight-chain organo-hydrogen polysiloxane represented by average structural formula $HMe_2SiO (Ph_2SiO)SiMe_2H$ Constituent b-2: Resinous organo-hydrogen polysiloxane represented by average unit formula $(HMe_2SiO_{1/2})_{60} (PhSiO_{3/2})_{40}$ (Constituent c: Inorganic filler)

Constituent c-1: Silica-titania composite oxide particles (Tokuyama Corporation product name: SILFIL specific surface area 101 g/m$^2$, refractive index 1.51)

Constituent c-2: Silica-titania composite oxide particles (Tokuyama Corporation product name: SILFIL specific surface area 101 g/m$^2$, refractive index 1.53)

Constituent c-3: Silica-titania composite oxide particles (Tokuyama Corporation product name: SILFIL specific surface area 154 g/m$^2$, refractive index 1.53)

Constituent c'-1: Fumed silica

Constituent d: A complex of platinum and 1,3-divinyl-1,1,3,3-tetramethyldisiloxane with a platinum concentration of 4.0 mass %

Constituent e: 1-Ethyl-2-cyclohexanol

The evaluations below were carried out and the results are summarized in Table 1.

[Viscosity and Thixotropic Index]

The viscosity of the curable silicone composition was measured by using a viscoelasticity measuring device (Anton Paar MCR 302), with a cone plate of cone diameter 40 mm and cone angle 2°, rotating in the same direction at shear speeds of 1/s and 10/s. The measurement temperature was 25° C. in all cases. The thixotropic index was calculated as the ratio of viscosity at (1/s)/(10/s). Viscosity is the value measured at a shear rate of 10/s.

[Refractive Index]

The refractive index of the curable silicone resin at 25° C. before hardening was measured by using an Abbé refractometer. A 589 nm light source was used for the measurements.

[Hardness of the Hardened Material]

The curable silicone composition obtained was hardened at 150° C. for 1 hour, test pieces 10 mm thick were produced, and hardness at 25° C. was measured by using a Durometer D hardness meter.

[Light Transmittance of the Hardened Material]

The curable silicone composition obtained was placed between two transparent glass sheets, hardened by heating at 150° C. for 1 hour, to make test pieces with a light path length of 1 mm. The light transmittance of these test pieces was measured at 25° C. using a self-recording spectrophotometer capable of measuring at any discretionary wavelength in the visible light range (wavelength 400-700 nm). Table 3 presents the values for transmittance at wavelength 450 nm.

As is evident from the results in Table 1 above, curable silicone compositions of the present invention show outstanding thixotropy and can form hardened material which has an outstanding refractive index, hardness and transparency.

INDUSTRIAL APPLICABILITY

Curable silicone compositions of the present invention show outstanding thixotropy, and can form hardened material with a desired shape, and the resulting hardened material has an outstanding refractive index, hardness and transparency, and hence for example, it is very useful for applications of dome-shaped or sheet-like sealing material when producing semiconductor packages.

TABLE 1

| Constituent | Examples | | | Comparative Examples | | | |
|---|---|---|---|---|---|---|---|
| | 1 | 2 | 3 | 1 | 2 | 3 | 4 |
| a-1 $M_5$-$M(Vi)_{17}$-$T_{39}$-$T(Ph)_{39}$ | 54.4 | — | 62.39 | 63.2 | — | — | — |
| a-2 $M_{14}$-$M(Vi)_{11}$-$T_{53}$-$T(Ph)_{22}$ | — | — | — | — | 61.2 | 61.2 | 52.7 |
| a-3 $M(Vi)_3$-$T(Ph)$ | 3.3 | — | 3.3 | 3.8 | — | — | — |
| a-4 $M(Vi)$-$D(Ph)_{20}$-$M(Vi)$ | 4.2 | 9.1 | 4.2 | 4.9 | — | — | — |
| a-5 $M(Vi)$-$D_{60}$-$D(Ph_2)_{30}$-$M(Vi)$ | — | — | — | — | 16.4 | 16.4 | 14.1 |
| a-6 $M(Vi)_{25}$-$T(Ph)_{75}$ | — | 55.69 | — | — | — | — | — |
| a-7 $D(Vi)_4$ | 0.2 | 0.9 | 0.2 | 0.2 | 0.2 | 0.2 | 0.2 |
| a-8 $M(Vi)_{13}$-$D(Ep)_{24}$-$T(Ph)_{46}$-$(OMe)_{17}$ | 2.5 | 2.5 | 2.5 | 2.9 | 2.4 | 2.4 | 2.1 |
| b-1 $M(H)$-$D(Ph_2)$-$M(H)$ | 18 | 16.8 | 19.4 | 21 | 10.8 | 10.8 | 9.2 |
| b-2 $M(H)_{60}$-$T(Ph)_{40}$ | — | 2.0 | — | — | 4.8 | 4.8 | 4.1 |
| c-1 $SiO_2$-$TiO_2$ composite particles RI1.51 | 17.39 | — | — | — | 3.9 | — | — |
| c-2 $SiO_2$-$TiO_2$ composite particles RI1.53 | — | 13 | — | — | — | — | — |
| c-3 $SiO_2$-$TiO_2$ composite particles RI1.51 | — | — | 8 | — | — | — | — |
| c'-1 Fumed silica | — | — | — | 3.99 | — | 3.9 | 17.3 |
| e 1-Ethyl-2-cyclohexanol | 0.01 | 0.01 | 0.01 | 0.01 | 0.3 | 0.3 | 0.3 |
| Total | 100 | 100 | 100 | 100 | 100 | 100 | 100 |
| d Platinum curing catalyst (Pt content ppm) | 1.5 | 3.0 | 1.5 | 1.5 | 4.0 | 4.0 | 4.0 |
| H/Vi | 0.8 | 0.8 | 0.8 | 0.8 | 1.1 | 1.1 | 1.1 |
| Evaluation | | | | | | | |
| Viscosity (Pa · s) | 20 | 20 | 20 | 15 | 9 | 20 | 25 |
| Thixotropic index | 3.5 | 3.5 | 3.5 | 3.2 | 1.5 | 3.2 | 3.3 |
| Refractive index | 1.51 | 1.53 | 1.51 | 1.50 | 1.48 | 1.48 | 1.48 |
| Hardness D | 52 | 63 | 51 | 50 | 30 | 30 | 32 |
| Light transmittance (%, 450 nm) | 98 | 98 | 99 | 50 | 45 | 85 | 20 |

What is claimed is:

1. A curable silicone composition which includes
   (A) alkenyl group-containing organopolysiloxane which has at least two silicon-bonded alkenyl groups per molecule,
   (B) organo-hydrogen polysiloxane which has at least two silicon-bonded hydrogen atoms per molecule,
   (C) silica-titania composite oxide particles at ≥3 mass % of the total mass of the composition,
   wherein the silica-titania composite oxide particles (C) exhibit a refractive index of from about 1.40 to about 1.58, measured at 589 nm, and
   (D) a curing catalyst,
   wherein the curable silicone composition exhibits a viscosity at 25° C. of ≤30 Pa·s.

2. The curable silicone composition as claimed in claim 1, wherein the aforementioned (C) silica-titania composite oxide particles have a surface area that is ≥50 m$^2$/g.

3. The curable silicone composition as claimed in claim 1, wherein the aforementioned (A) alkenyl-group-containing organopolysiloxane includes a resin organopolysiloxane, a straight-chain organopolysiloxane or both in which the quantity of aryl groups among total silicon-bonded functional groups is ≥20 mol %.

4. A sealing material which includes a curable silicone composition as claimed in claim 1.

5. An optical semiconductor device provided with sealing material as claimed in claim 4.

6. A curable silicone composition which includes
   (A) alkenyl group-containing organopolysiloxane which has at least two silicon-bonded alkenyl groups per molecule,
   (B) organo-hydrogen polysiloxane which has at least two silicon-bonded hydrogen atoms per molecule,
   (C) silica-titania composite oxide particles at ≥3 mass % of the total mass of the composition,
   wherein the silica-titania composite oxide particles (C) exhibit a refractive index of from about 1.40 to about 1.50, measured at 589 nm, and
   (D) a curing catalyst.

7. The curable silicone composition of claim 6 exhibiting a viscosity at 25° C. of ≤30 Pa·s.

8. The curable silicone composition as claimed in claim 6, wherein the aforementioned (C) silica-titania composite oxide particles have a surface area that is ≥50 m$^2$/g.

9. The curable silicone composition as claimed in claim 6, wherein the aforementioned (A) alkenyl-group-containing organopolysiloxane includes a resin organopolysiloxane, a straight-chain organopolysiloxane or both in which the quantity of aryl groups among total silicon-bonded functional groups is ≥20 mol %.

10. A sealing material which includes a curable silicone composition as claimed in claim 6.

11. An optical semiconductor device provided with sealing material as claimed in claim 10.

12. The curable silicone composition as claimed in claim 2, wherein the aforementioned (A) alkenyl-group-containing organopolysiloxane includes a resin organopolysiloxane, a straight-chain organopolysiloxane or both in which the quantity of aryl groups among total silicon-bonded functional groups is ≥20 mol %.

13. A sealing material which includes a curable silicone composition as claimed in claim 2.

14. A sealing material which includes a curable silicone composition as claimed in claim 3.

15. An optical semiconductor device provided with sealing material as claimed in claim 13.

16. An optical semiconductor device provided with sealing material as claimed in claim 14.

17. A sealing material which includes a curable silicone composition as claimed in claim 12.

* * * * *